Nov. 13, 1934.  W. C. OSTERHOLM  1,980,289

CLUTCH

Filed March 28, 1932

INVENTOR
William C. Osterholm.
BY
ATTORNEYS.

Patented Nov. 13, 1934

1,980,289

UNITED STATES PATENT OFFICE 1,980,289

CLUTCH

William C. Osterholm, Oak Park, Ill.

Application March 28, 1932, Serial No. 601,497

22 Claims. (Cl. 192—41)

The invention relates to clutches and it has particular relation to a clutch of the one-way type, wherein, for example, a driving member rotates a driven member in one direction but is capable of freely rotating in the other direction without imparting rotary movement to the driven member.

In certain respects the invention relates to and constitutes an improvement over the inventions embodied in my co-pending applications for patent relating to clutches of the above designated character, identified by Serial Numbers 522,943, 536,216 and 570,405, filed respectively on March 16, 1931, May 9, 1931 and October 22nd, 1931.

One of the objects of the present invention is to provide an improved clutch of the above designated character in which a series of blades is disposed between the driving and driven members for wedging engagement therewith, and wherein each blade is constructed to more satisfactorily and efficiently withstand the wedging forces imparted thereto during operation of the clutch. It will be appreciated that a clutch of this type may be subjected to considerable torque stresses, and inasmuch as this torque is directed through the blades, it is quite important to have a blade construction which will obtain the necessary wedging engagement between the driving and driven members, in a quick and positive manner, without any danger of destroying the clutching engagement by overrunning of the blades beyond the wedging engagement position or positions.

Another object of the invention is to provide an improved type of blade having greater durability, which insures continued utility thereof regardless of normal wear of the parts over a long period of time during which the clutch may be used.

Another object of the invention is to provide a blade for a clutch of this character, which may be stamped from sheet metal, and so formed that a greater circumferential length of edge surface contact may be obtained between the blade and one of the members, than that obtainable by a plane blade. Particularly, it is desired to accomplish this by bending the blade so as to direct parts thereof more or less circumferentially, thereby in effect, increasing the circumferentially directed length of edge surface of the blade which may contact with one of the members. If the blade is flat and disposed in an axial plane, it is manifest that the greatest circumferential length of edge surface contact between the member and blade may not be much more than the thickness of the blade. Accordingly, by bending the blade intermediate its end edges, greater circumferential length of surface contact may be had between the blade and the member without necessitating using thicker material, thereby permitting manufacture of the blade from thinner sheet metal, while obtaining the desired circumferential surface length contact.

Another object of the invention is to provide an improved type of clutch, in which the blades operate in a substantially simultaneous manner, to insure equal distribution of loads on the blades, and prevent overloading of one or several of the blades.

Other objects of the invention will become apparent from the following specification taken in conjunction with the drawing, and from the claims hereinafter set forth.

For a better understanding of the invention, reference may be had to the accompanying drawing, wherein.

Figure 1:
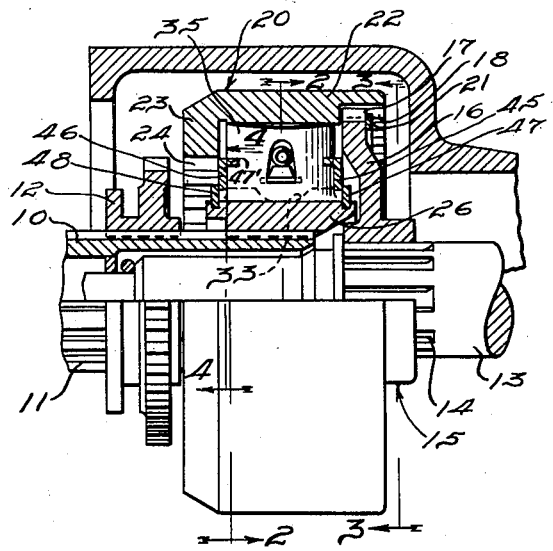
Fig. 1 is a cross-sectional view illustrating a clutch constructed according to one form of the invention.
Figure 3:
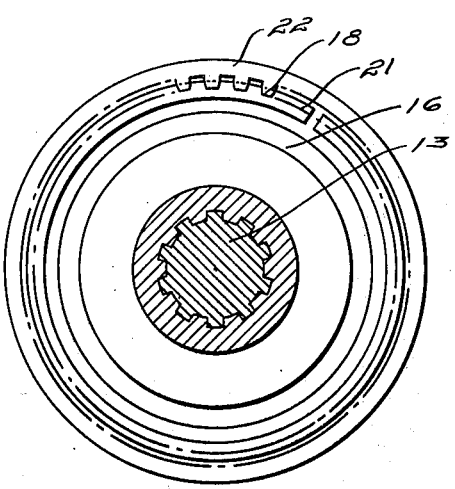
Fig. 3 is a cross-sectional view taken substantially along the line 3—3 of Fig. 1.
Figure 2:
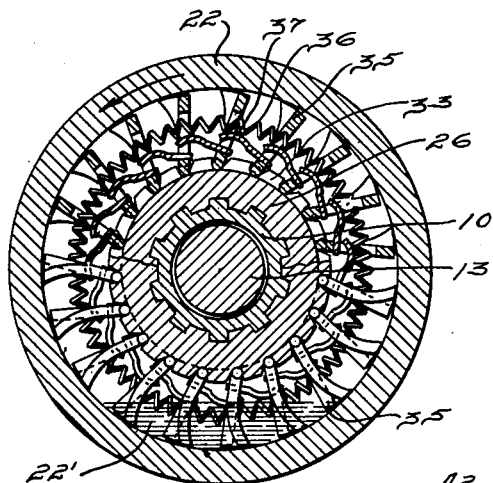
Fig. 2 is a cross-sectional view taken substantially along the line 2—2 of Fig. 1.

Referring to Figs. 1 and 2, a tubular shaft 10 is illustrated, which has axially extending teeth 11 on its outer periphery, for splining a clutch member 12 thereon in such manner that the latter is driven by the shaft but is longitudinally movable thereon. A second and solid shaft 13 is disposed beyond the end of the shaft 10 and is provided with teeth 14 which serve to lock a hub member 15 thereon in driving relation thereto. The hub member 15 has an outwardly directed flange 16 provided on its outer peripheral edge with teeth 17 meshing with teeth 18 formed at one end of a casing 20, extending around both shafts in concentric relation thereto. A split locking ring 21 seated in a groove formed in the teeth 18 in the casing, locks the hub member to the casing against relative axial movement. The casing member has a cylindrical portion 22 and at the opposite end of the latter, is provided with an inwardly directed portion 23 having teeth 24 on its inner periphery adapted to mesh with the teeth on clutch member 12 when the latter is properly moved axially of shaft 10, although normally the clutch member will not engage such teeth. The shaft 13 is suitably supported in bearings in shaft 10 for rotation with respect to the latter and this manner of mounting the shaft may be effected in any well known way. It is apparent that shaft 13 has driving engagement with the hub 15 and hence the casing 20 while the clutch member 12 may have driving engagement with shaft 13, in the event the clutch member 12 is moved into meshing relation with the teeth 24, in which case the shafts will be positively locked together and upon rotation of either shaft in either direction, corresponding and simultaneous movement of the other shaft will occur.

Within the casing 20 a hub member 26 is mounted on the end of shaft 10, and teeth thereon engaging the teeth 11 on the shaft drivingly lock these members together. This locking engagement between the hub member and shaft is such that axial movement of the hub member normally will not be permitted and hence the parts will be positively connected against axial displacement. The present invention relates particularly to means for providing a one-way clutch driving engagement between the hub member 26 and the casing 20 and particularly with the inner peripheral surface of the cylindrical portion 22 of such casing. When the clutch member 12 is in mesh with the teeth 24, it is evident that this one-way clutch would not function and hence its operation may be prevented and both shafts positively connected in driving relation in either direction. If the clutch member 12 is not in mesh with the teeth, the one-way clutch will serve to connect the shaft 10 with shaft 13 for driving purposes in one direction only.

Figure 5:
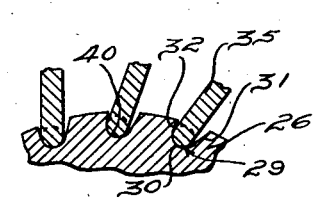
Fig. 5 is a fragmentary cross-sectional view illustrating the manner of pivotally mounting the clutch blade on the inner shaft member.

Referring now to Figs. 2 and 5, the hub member 26 has a series of circumferentially spaced, axially extending grooves 29 formed in its outer peripheral surface, and each of these grooves is defined by an arcuate base 30 and side walls 31 and 32 directed substantially tangentially to the base. The side wall 31 is directed approximately at an angle of 20 degrees to a radius extending from the axis of the hub member to the center of curvature of the arcuate base of the groove, while the side wall 32 preferably is directed substantially parallel to the radius.

Centrally of its ends, the outer periphery of the hub member is formed with a circumferentially extending groove 33, substantially equal in depth to the grooves 29 and the purpose of this groove will be mentioned hereinafter.

A series of circumferentially spaced blades 35 are provided between the hub member 26 and the inner peripheral surface of the cylindrical portion 22 of the casing 20, and each blade is biased toward a radial position with respect to the axis of the hub member and casing, by means of a circumferentially directed helical spring 36 extending through openings formed in the blades intermediate their inner and outer edges. For effecting this biasing movement of the blades, each blade has a lip 37 extending circumferentially beyond the radial plane toward which the blade is to be biased and the spring seats on a portion of this lip beyond such plane so that the force of the spring, which is contractile, acting through the lip 37 tends to bias the blades in the direction previously mentioned. Each of the blades, as shown best by Figs. 5 and 6, has a partially cylindrical inner edge 40, seating pivotally in the groove 29 in the hub member 26, and the radius of curvature of such edge may be slightly smaller than the radius of curvature of the arcuate base 30 of the groove, so as to obtain substantially line contact with the latter, or such partially cylindrical edge of the blade may have the same curvature on the base of the groove although the line contact is preferred.

Figure 4:
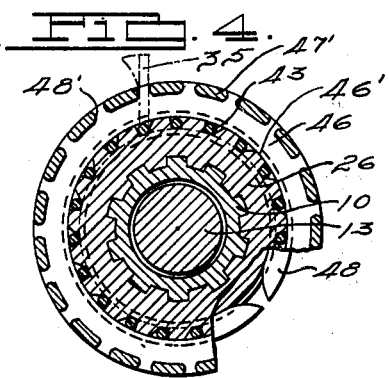
Fig. 4 is a cross-sectional view taken substantially along the line 4—4 of Fig. 1.

Each blade at its end is provided with cylindrical trunnions 42 and 43 having the same axis of curvature as the partially cylindrical edge 40 and such trunnions serve as a means for positively maintaining the blades on the hub member 26 without interfering with pivotal movement of the blades. For effecting this result ring plates 45 and 46 are mounted on the hub member 26 at opposite ends of the blades, and each of the ring plates is of such inside diameter that its inner surface is substantially tangential to the outer curved surfaces of the trunnions as shown by Fig. 4. Also the hub member 26 adjacent the trunnions, has an outer surface 46' which is of such diameter as to permit free sliding movement of the ring plates circumferentially with respect to such surfaces, while at the same time substantially supporting them. It is apparent that the plates will maintain the trunnions in the grooves.

Figures 6, 7:
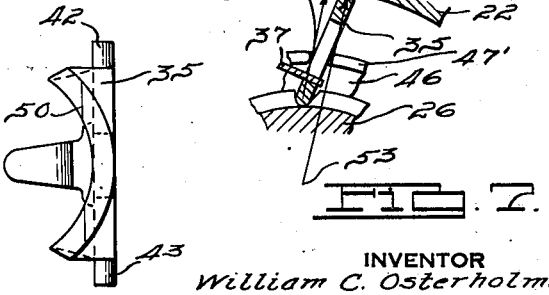
Fig. 6 is an outer end view of one of the blades, as seen when removed from the clutch.
Fig. 7 illustrates the contour of the blade, and particularly that of its outer edge, and the manner in which the blade cooperates with the outer shaft member.

Now as shown best by Figs. 4 and 7, the ring plates 45 and 46 have on their adjacent sides, circumferentially spaced projections 47', such projections on each plate being located at the outer periphery of the plate and being equal in number to the number of blades. The space between each pair of projections, accommodates a blade 35, but this space is sufficient to permit fulcruming movement of the blades on the hub member with simultaneous movement of the ring plates circumferentially. The distance between projections may be substantially equal to the thickness of the blade edge, particularly if the adjacent edges of the projections are rounded as shown at 48'. Now it will be evident that if any blade fulcrums on the hub member, it will move the ring plates and that the other blades must fulcrum therewith, so that the plates will insure simultaneous movement of all blades when any blade or blades fulcrum.

It may also be noted that the ring plates 45 and 46 maintain the blades in substantially the same position, or in other words, the blades will all be biased equally for example, for any one biased position of any blade. The helical spring, therefore, will engage the lips on all blades with equally distributed forces, as the lips, relative to each other, will be equally positioned at all times, with respect to the axis of the hub. Since the spring acts equally on all blades at all times, it is apparent that it, at all times, tends to throw all blades into their operative positions simultaneously and with equal force.

This arrangement is particularly beneficial when lubricant in the casing 22, as indicated at 22', is or becomes stiff, as for example in cold weather, and the inertia of the lubricant affects only a few blades owing to its level. These blades would, owing to the stiffness of the lubricant, be thrown into their operative positions more quickly and strongly in the absence of the ring plates, and hence at least initially, a great torque load would be imposed thereon and such blades might be damaged. The ring plates insure simultaneous action of the blades under such conditions, so as to substantially distribute the torque uniformly to all blades.

The ring plates with the projections, may be stamped from sheet metal as evident, and the projections may be axially bent over after stamping.

For holding them on the hub member against axial movement, split locking rings 47 and 48 are provided which seat in grooves in the hub member at opposite ends of the latter and maintain the blades in position.

In constructing a clutch of this character, particularly under present day competitive manufacturing conditions, it is of the utmost importance that the clutch operate satisfactorily, efficiently and constantly for the purposes for which it is intended, that the clutch be extremely durable and strong, and that all of these results be obtained by a clutch which may be manufactured with minimum expense. Not only must the number of parts be considered in contemplating the expense of manufacture, but the manner of manufacturing the clutch, the material from which it is manufactured, and assembling operations must be considered if the expense of the clutch is to be kept at a minimum. It is quite important in a clutch of the general type described, that the blades may be manufactured as inexpensively as possible. For this reason, it is highly desirable that they be manufactured from sheet metal so that they may be stamped therefrom, without requiring unnecessary machining or casting operations. However, in stamping blades from sheet metal, it is quite apparent that unless the metal is very thick, the torque stresses imparted to the blade tend to overcome their resistance to circumferential deformation and if this torque stress is sufficient and the blade is not properly reinforced, the driving member may, in fact override the driven member and defeat the purposes of the clutch. Of course, it is evident that the thicker the material the blade is manufactured from, the more expensive it is, and moreover, the more difficult it is to properly form the blade. It should be evident that sheet metal of certain and minimum thickness may be employed, if the blade is properly reinforced by forming it to more strongly resist torque stresses. It is also important that the outer edge surface of the blade cooperate with the inner surface of the cylindrical portion 22 of the casing 20 in a highly desirable manner to effect proper clutching engagement and wedging action of the blade between the hub and casing.

Referring now to the blade particularly as shown by Figs. 6 and 7, it will be noted that the metal is of uniform thickness but that intermediate its end edges it is pressed into arcuate shape as indicated at 50. The shape of this blade is such that the inner edge is straight in an axial direction and from such inner edge the blade gradually bows outwardly until the outer edge has a distinct curve in a generally axial direction as shown. It follows that that area of the end face of the blade outermost, covers a greater circumferential distance, although of course, the area of the edge surface is not varied to any considerable extent. So bowing the blade intermediate its ends naturally strengthens it against torque forces as evidently it would be more difficult to bend the blade in a circumferential direction.

Now as shown particularly by Fig. 7, the end face of the blade approximately between the points 51 and 52 is curved and has a radius of curvature, the center of which is located approximately at the point 53. From the point 51 to the corner edges of the end face, the latter has a curvature, the center of which substantially coincides with the center of pivotal movement of the inner edge of the blade in the groove 29. When the blade is initially contacting with the cylindrical wall of the casing, the corner face portions mentioned, initially contact with such cylindrical wall at points nearly aligned and substantially in alignment with a radial plane passing through the center of the hub member and the center of pivotal movement of the blade, but slightly to the lag side of such radial plane. The remainder of the edge face on the blade may not be in contact with the cylindrical casing wall, but when sufficient torque force is imparted to the blades, by counter clockwise movement of the casing, as shown by Fig. 2, such corner face portions of the end face will not only wedge between the hub member and the casing, but as this torque force increases, to increase the wedging action, slight axial flattening movement of the blades may occur to bring more of the end face of the blade in a circumferential direction, into contact with the casing wall. It may be added that the center 53 preferably is located between the center of the hub member and the blade pivot.

Accordingly as the torque force increases more and more of the end face of the blade will be brought into contact with the casing wall, and this is not only desirable to compensate for the increase in torque forces, but is also desirable to compensate for any wear that may occur during the life of the blades. It is evident also, that this arrangement prevents the blades from moving past such position that the casing would override the hub member and move the blades counterclockwise with respect to the hub member to such extent that the wedging action would be destroyed. In other words, the arrangement insures more and more contact with the casing wall as the torque force is increased, compensates for wear, and at the same time prevents the blades from being moved past wedging position to destroy the effect of the clutch. The different curvatures are desirable to provide better contact and a more forceful wedging engagement as the torque forces are imparted by the casing to the blades and it has been found very desirable to have the blades provided with end faces of this character.

A clutch of the character described has been found very efficient in operation as a positive one-way drive between a driving member and a driven member, moreover the blades being constructed from sheet metal may be manufactured very inexpensively, while at the same time, by deforming them in the manner described, the strength thereof may be greatly increased to resist very strong torque forces and to insure driving connections at all times. While the substantially radial wall 32 of the grooves in the hub member will prevent the inner edges of the blades from normally moving beyond a certain position to disengage the blades from the outer cylinder wall, it is apparent that the reinforcement of the blade intermediate its inner and outer edges will normally prevent any circumferential deformation that would destroy the wedging action. The invention has been found very practical and successful for the purpose of providing a one-way driving connection between rotary shafts, and permitting free movement in the other direction of one member with respect to the other.

Although only one form of the invention has been shown and described in detail, it will be apparent to those skilled in the art that various modifications may be made without departing from the scope of the appended claims.

I claim:

1. A clutch comprising inner and outer members for operative connection with different shafts, and a blade between the members and adapted to have edge surface contact therewith, one edge face of the blade for contact with a surface of one of the members, comprising curved, circumferentially distinct portions having different radii of curvature.

2. A clutch comprising inner and outer members for operative connection with different shafts, a blade between the members and adapted to have edge surface contact therewith, one edge face of the blade for contact with a surface of one of the members, comprising curved, circumferentially distinct surface portions having different radii of curvature, and means for biasing the blade into such edge surface contact with the member, with the surface portion of smaller radii of curvature having initial contact with the member.

3. A clutch comprising inner and outer members for operative connection with a pair of shafts, and a blade pivoted at one end on one of the members, which is slightly longer than the radial distance between the members, said blade at its opposite end having circumferentially distinct curved surface portions of different radii of curvature, adapted successively to engage the surface of the other member.

4. A clutch comprising inner and outer members adapted for connection with shafts, a blade pivoted at one end on one of the members and being longer than the radial distance between the members so as to be slightly biased between them, said blade at its opposite end having circumferentially curved surface portions of different radii for contact with the other member, one of such surface portions being disposed for preceding engagement with said other member.

5. A clutch comprising inner and outer members adapted for connection with shafts, a blade pivoted at one end on one of the members and being longer than the radial distance between the members so as to be slightly biased between them, said blade at its opposite end having circumferentially curved surface portions of different radii for contact with the other member, one of such surface portions being disposed for preceding engagement with said other member, and one of said curved surface portions having its center of curvature substantially coinciding with the pivotal center of the blade.

6. A clutch comprising inner and outer members for operative connection with different shafts, and a blade between the members and adapted to have edge surface contact therewith, one edge face of the blade for contact with a surface of one of the members, comprising curved, circumferentially distinct surface portions having different radii of curvature, one of said curved surface portions having a center of curvature substantially coinciding with the opposite end portion of the blade.

7. A clutch comprising inner and outer members adapted for connection with shafts, a blade pivoted at one end on one of the members and being longer than the radial distance between the members so as to be slightly biased between them, said blade at its opposite end having circumferentially curved surface portions of different radii for contact with the other member, said surface portions having different radii of curvature, the surface portion of smaller radii being disposed for preceding engagement with said other member, and one of said surface portions having its center of curvature located between the axis of the members and the opposite edge of the blade.

8. A clutch comprising inner and outer members adapted for connection with shafts, a blade pivoted at one end on one of the members and being longer than the radial distance between the members so as to be slightly biased between them, said blade at its opposite end having circumferentially curved surface portions of different radii for contact with the other member, one of said surface portions being disposed for preceding engagement with said other member, one of said curved surface portions having its center of curvature substantially coinciding with the opposite edge of the blade and another curved surface portion having its center of curvature located between such opposite edge of the blade and the axis of the shafts.

9. A clutch comprising inner and outer members for connection respectively with different shafts, and a blade disposed between the members normally in a biased position for drivingly connecting the members, said blade being bent in a direction axially of the shafts.

10. A clutch comprising inner and outer members, and a blade disposed between the members in a normally biased position for driving edge contact therewith to connect the members in driving relation, said blade having its one edge face provided with curved portions having different radii of curvature, and having its body portion curved in one direction.

11. A clutch comprising inner and outer members, and a blade disposed between the members in a normally biased position, said blade being of substantially uniform thickness, and having a portion of its body bowed in a direction axially of the members.

12. A clutch comprising inner and outer members, and a blade disposed between the members and being fulcrumed at one edge on one member for circumferential pivotal movement and being of such length that it is normally biased between the members, the other edge surface of the blade having corner portions offset circumferentially from the intermediate portion of the blade to obtain advance contact of such corner portions with the other member.

13. A clutch comprising inner and outer members, and a blade fulcrumed on the inner member and disposed between the members in a generally biased position, the outer edge face of the blade having circumferentially disposed surface portions adapted to sequentially contact with the outer member, the precedent surface portion having initial contact with the outer member in a plane substantially coinciding with the axis of the members and the center of the blade fulcrum.

14. A clutch comprising inner and outer members, blades disposed between the members, each blade having one edge pivoted on one member at a fixed pivot point on the latter and having its other edge disposed for wedging engagement with the other member to connect the members in driving relation in one direction but to permit movement of one member with respect to the other in the opposite direction, and means for positively insuring substantially simultaneous and equal pivotal action of all blades upon pivotal movement of any blade and for maintaining the pivotal edges of the blades in pivotal contact with the member upon which they are pivoted.

15. A clutch comprising inner and outer members, blades disposed between the members, one edge of each blade being pivotally mounted in a groove in one of the members, and its other edge being adapted for wedging engagement with the other member to connect the members in driving relation in one direction but to permit movement of one member with respect to the other in the opposite direction, and means for positively insuring substantially simultaneous and equal pivotal action of all blades upon pivotal movement of any one blade, and for maintaining the edges of the blades in the grooves provided therefor.

16. A clutch comprising inner and outer members, blades disposed between the members and pivotally mounted on one member at one edge of the blades, each of the blades at the latter edge having a trunnion projecting from one axial end thereof with the axis of the trunnion substantially coinciding with the axis of pivotal action of the blade, the opposite edge of the blade being adapted to wedgingly engage the other member to drivingly connect the members in one direction, and means for insuring substantially simultaneous and equal pivotal action of all blades upon pivotal movement of any one blade, said means comprising a ring extending circumferentially over the trunnions and having portions projecting axially between the blades.

17. A clutch comprising inner and outer members, and a blade disposed between the members in a normally biased position, said blade being of substantially uniform thickness and having its edge fulcrumed on one member, the other edge portion of the blade having a section offset circumferentially with respect to the plane of the blade to substantially increase the circumferential length of the edge contacting surface and to increase the rigidity of the blade.

18. A clutch comprising inner and outer members, and a blade disposed between such members in a normally biased position, said blade having circumferentially offset portions at one edge to provide an edge contacting face which is curved transversely to the axial plane of the blade.

19. A clutch comprising inner and outer members, and a blade disposed between such members in a normally biased position, said blade being of substantially uniform thickness and having portions at one edge offset circumferentially to provide an edge contacting face transversely irregular with respect to the axial plane of the blade so as to increase the circumferential extent of said face and also increase the rigidity of the blade.

20. A clutch comprising inner and outer members, blades disposed between the members and pivotally mounted on one member at one edge of the blades, each of the blades at the latter edge having a trunnion projecting from one axial end thereof with the axis of the trunnion substantially coinciding with the axis of pivotal action of the blade, the opposite edge of the blade being adapted to wedgingly engage the other member to drivingly connect the members in one direction, and means mounted on the trunnions and engaging all of the blades for insuring pivotal movement of the latter simultaneously.

21. A clutch comprising inner and outer members, blades disposed between the members and pivotally mounted on one member at one edge of the blade, each of the blades at the latter edge having a trunnion projecting from one axial end thereof with the axis of the trunnion substantially coinciding with the axis of pivotal action of the blade, the opposite edge of the blade being adapted to wedgingly engage the other member to drivingly connect the members in one direction, and means mounted on the trunnions and having portions projecting between the blades for insuring pivotal movement thereof simultaneously.

22. A clutch comprising inner and outer members, blades disposed between the members and pivotally mounted on one member at one edge of the blade, each of the blades at the latter edge having a trunnion projecting from one axial end thereof with the axis of the trunnion substantially coinciding with the axis of pivotal action of the blade, the opposite edge of the blade being adapted to wedgingly engage the other member to drivingly connect the members in one direction, means mounted on the trunnions and engaging all of the blades for insuring pivotal movement thereof simultaneously, and common means for biasing all of the blades into wedging relation to the members.

WILLIAM C. OSTERHOLM.